(12) United States Patent
Coates et al.

(10) Patent No.: US 11,822,402 B2
(45) Date of Patent: Nov. 21, 2023

(54) DISTRIBUTED BATTERY MANAGEMENT SYSTEM USING BLOCKCHAIN BASED DATA STORAGE

(71) Applicant: The Boeing Company, Chicago, IL (US)

(72) Inventors: Dwaine K. Coates, Joplin, MO (US); Caitlin Nicole Dillard, Wilmington, DE (US)

(73) Assignee: The Boeing Company, Arlington, VA (US)

( * ) Notice: Subject to any disclaimer, the term of this patent is extended or adjusted under 35 U.S.C. 154(b) by 51 days.

(21) Appl. No.: 17/456,352

(22) Filed: Nov. 23, 2021

(65) Prior Publication Data

US 2022/0187890 A1    Jun. 16, 2022

Related U.S. Application Data

(60) Provisional application No. 63/126,155, filed on Dec. 16, 2020.

(51) Int. Cl.
*G06F 1/26* (2006.01)
(52) U.S. Cl.
CPC ..................... *G06F 1/26* (2013.01)
(58) Field of Classification Search
None
See application file for complete search history.

(56) References Cited

U.S. PATENT DOCUMENTS

| | | | |
|---|---|---|---|
| 2019/0042228 A1* | 2/2019 | Nolan | G06F 8/64 |
| 2019/0295336 A1 | 9/2019 | Jones | |
| 2019/0353709 A1* | 11/2019 | Kaisers | G01R 31/392 |
| 2020/0193363 A1 | 6/2020 | Jones | |
| 2020/0313249 A1* | 10/2020 | Zhao | G06Q 10/087 |
| 2021/0271303 A1* | 9/2021 | Vichare | G06F 1/28 |
| 2022/0036330 A1* | 2/2022 | Ong | G06Q 20/3224 |
| 2022/0121260 A1* | 4/2022 | King | H02J 3/007 |

OTHER PUBLICATIONS

Faika, T. et al., "A Blockchain-Based Internet of Things (IoT) Network for Security-Enhanced Wireless Battery Management Systems," Proceedings of 2019 IEEE Industry Applications Society Annual Meeting, Sep. 29, 2019, Baltimore, Maryland, 6 pages.

* cited by examiner

*Primary Examiner* — Danny Chan
(74) *Attorney, Agent, or Firm* — Alleman Hall Creasman & Tuttle LLP

(57) ABSTRACT

A distributed battery management system for a plurality of batteries is controlled by a blockchain computer network comprising a plurality of computer nodes. A computer node is configured to store a battery management blockchain including a plurality of blocks. The blocks of the battery management blockchain include battery telemetry data for the plurality of batteries. The distributed battery management system is operated according to a computer-implemented method including computer-reading the battery management blockchain stored at the computer node of the blockchain computer network and computer-adjusting an operating parameter of a selected battery of the plurality of batteries based on such computer-reading of the battery management blockchain.

20 Claims, 5 Drawing Sheets

DISTRIBUTED BATTERY MANAGEMENT SYSTEM USING BLOCKCHAIN BASED DATA STORAGE

CROSS REFERENCE TO RELATED APPLICATIONS

This application claims priority to U.S. Provisional Patent Application Ser. No. 63/126,155, filed Dec. 16, 2020, the entirety of which is hereby incorporated herein by reference for all purposes.

FIELD

This disclosure relates generally to battery management systems, and more specifically, to distributed battery management systems that control a plurality of batteries while increasing battery data security.

BACKGROUND

A battery management system may be employed to monitor and control a plurality of batteries in a coordinated manner in order to maximize battery performance, operational life, and health of the batteries. In some examples, a battery management system may employ a centralized battery management architecture in which a single battery management device provides control for all of the batteries. However, as a number of batteries under control scales up beyond a threshold number, the centralized battery management architecture may not be feasible to accurately control all of the batteries.

SUMMARY

A distributed battery management system for operating a plurality of batteries is controlled by a blockchain computer network comprising a plurality of computer nodes. A computer node is configured to store a battery management blockchain including a plurality of blocks. The blocks of the battery management blockchain include battery telemetry data reported for the plurality of batteries. The distributed battery management system is operated according to a computer-implemented method including computer-reading the battery management blockchain stored at the computer node of the blockchain computer network and computer-adjusting an operating parameter of a selected battery of the plurality of batteries based on such computer-reading of the battery management blockchain.

The features, functions, and advantages that have been discussed can be achieved independently in various embodiments or may be combined in yet other embodiments, further details of which can be seen with reference to the following description and drawings.

DETAILED DESCRIPTION

Figure 1:
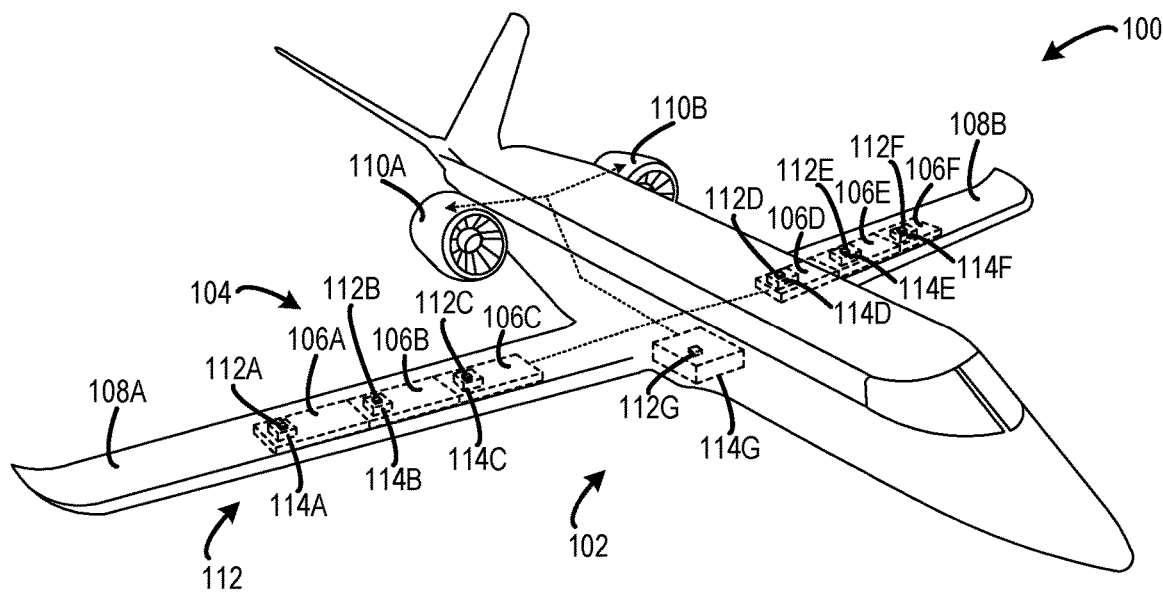
FIG. 1 schematically shows an example scenario where a distributed battery management system controls a plurality of batteries distributed throughout a vehicle.

A battery management system having a conventional centralized management architecture may suffer from various issues when controlling a large number of batteries (e.g., thousands of battery cells grouped into dozens, hundreds, thousands, etc. of different battery units). As one example, once the number of batteries under centralized management scales up significantly, the battery management system may be unable to provide accurate and timely control of all of the batteries. In particular, the centralized battery management system may have computer processing and/or computer network communication limitations that do not allow the centralized battery management system to provide control commands to control of all of the batteries. Furthermore, when management is centrally consolidated, the management system may be susceptible to a single point of failure. Such a single point of failure may be caused by a power outage, a hardware failure, a cyberattack, an inadvertent human error, or other compromise.

To address the above and other issues, examples are disclosed where a distributed battery management system for operating a plurality of batteries works with a blockchain computer network. The blockchain computer network has multiple computer nodes that are each configured to store a battery management blockchain with a plurality of blocks. Each block includes battery telemetry data obtained for the plurality of batteries, e.g., by reporting from a vehicle in which a battery is installed. The battery telemetry data indicates values of operating parameters, operating states, and/or control/adjustments in operation of each battery. In one example, a computer-implemented method is used that includes computer-reading the battery management blockchain stored at a computer node of the blockchain computer network, and then computer-adjusting an operating parameter of a selected based on such computer-reading. Different batteries can be controlled by different computer nodes of the blockchain computer network according to the computer-implemented method, such that the plurality of computer nodes collectively control the plurality of batteries in a coordinated and distributed manner.

By using the battery management blockchain as a data storage mechanism for the distributed battery management system, multiple computer nodes are able to write to the battery management blockchain while ensuring accuracy and retention of reported battery telemetry data in a secure manner. In particular, the battery management blockchain provides a time-stamped series of immutable records of data (i.e., block of the battery management blockchain) that is managed by the plurality of computer nodes of the blockchain computer network. Each of the blocks is secured and bound to each other using cryptographic mechanisms that form the battery management blockchain. The battery management blockchain maintains a secure, validated, and immutable full historical record of the battery telemetry data and any other data that is communicated between the different computer nodes of the blockchain computer network.

The battery management blockchain enables the plurality of computer nodes of the blockchain computer network to collectively provide distributed control of the plurality of batteries since each computer node has a full historical record of operation of the batteries. Moreover, the distributed nature of the blockchain computer network may mitigate any single point of failure issues. For example, if one computer node become unavailable, then other computer nodes of the blockchain computer network in other locations will still have the full historical record provided by the battery management blockchain and may continue to monitor and control operation of the plurality of batteries.

Furthermore, such data accuracy and security provided by the battery management blockchain enables the distributed battery management system to control the plurality of batteries with optimal performance while minimizing the possibility of battery degradation resulting from data corruption. Moreover, such data retention provided by the battery management blockchain enables a historical record of battery operation to be maintained for the batteries that allows for trended analysis to be performed on the plurality of batteries over time. The distributed battery management system may be configured to adjust control of the batteries based on such trended analysis in order to optimize performance of the batteries as the batteries age.

Further still, the distributed nature of the blockchain computer network offers the benefit of making the distributed battery management system highly scalable since additional computer nodes can be added to the blockchain computer network in order to manage operation of additional batteries. The distributed battery management system may realize the most efficiency and performance gains relative to a centralized battery management system when deployed to monitor and control a large-scale number of batteries (e.g., thousands of battery cells grouped into dozens, hundreds, thousands, etc. of different batteries). However, the distributed battery management system may be used to monitor and control any suitable number of batteries. Moreover, the highly-scalable nature allows for the distributed battery management system allows to be deployed to monitor and control batteries in a variety of different applications.

Although the illustrated examples show an implementation of batteries and battery management systems, on an aircraft, the use on any system of batteries is contemplated. The use is not limited to aircraft or vehicles.

FIG. 1 schematically shows an example scenario where multiple batteries are distributed across an aircraft 100. The aircraft 100 is a hybrid-electric aircraft that is at least partially powered by an electric drive system 102. The electric drive system 102 is configured to draw power from a plurality of batteries 104. The batteries 104 are arranged into battery banks 106A, 106B, 106C, 106D, 106E, 106F positioned in wings 108A, 108B of the aircraft 100. Each bank 106A-106F includes a plurality of battery cells (not shown). The electric drive system 102 provides electrical power via batteries 104 to a pair of propulsion motors 110A, 110B. Additionally or alternatively, the plurality of batteries 104 can provide power to other components of the aircraft 100.

A distributed battery management system 112 is configured to monitor and control operation of batteries 104. The distributed battery management system 112 is collectively executed by computer nodes 114A, 114B, 114C, 114D, 114E, 114F corresponding to the battery banks 106A-106F, such that each computer node is configured to execute a corresponding instance or portion of the battery management system 112A, 112B, 112C, 112D, 112E, 112F to monitor and control battery cells in a different corresponding battery bank. For example, the computer node 114A is configured execute a corresponding instance of the distributed battery management system 112A to monitor and control the plurality of battery cells of the battery bank 106A, and so on for each battery bank. Additionally, an instance of the distributed battery management system 112G is executed by a computer node 114G that is not associated with any particular battery bank to perform various battery monitoring and control operations and/or other operations related to a blockchain management. The plurality of computer nodes 114A-114G form a blockchain computer network (i.e., blockchain computer network 300 shown in FIG. 3) in which each computer node is communicatively coupled to each other computer node of the blockchain computer network.

Figure 3:
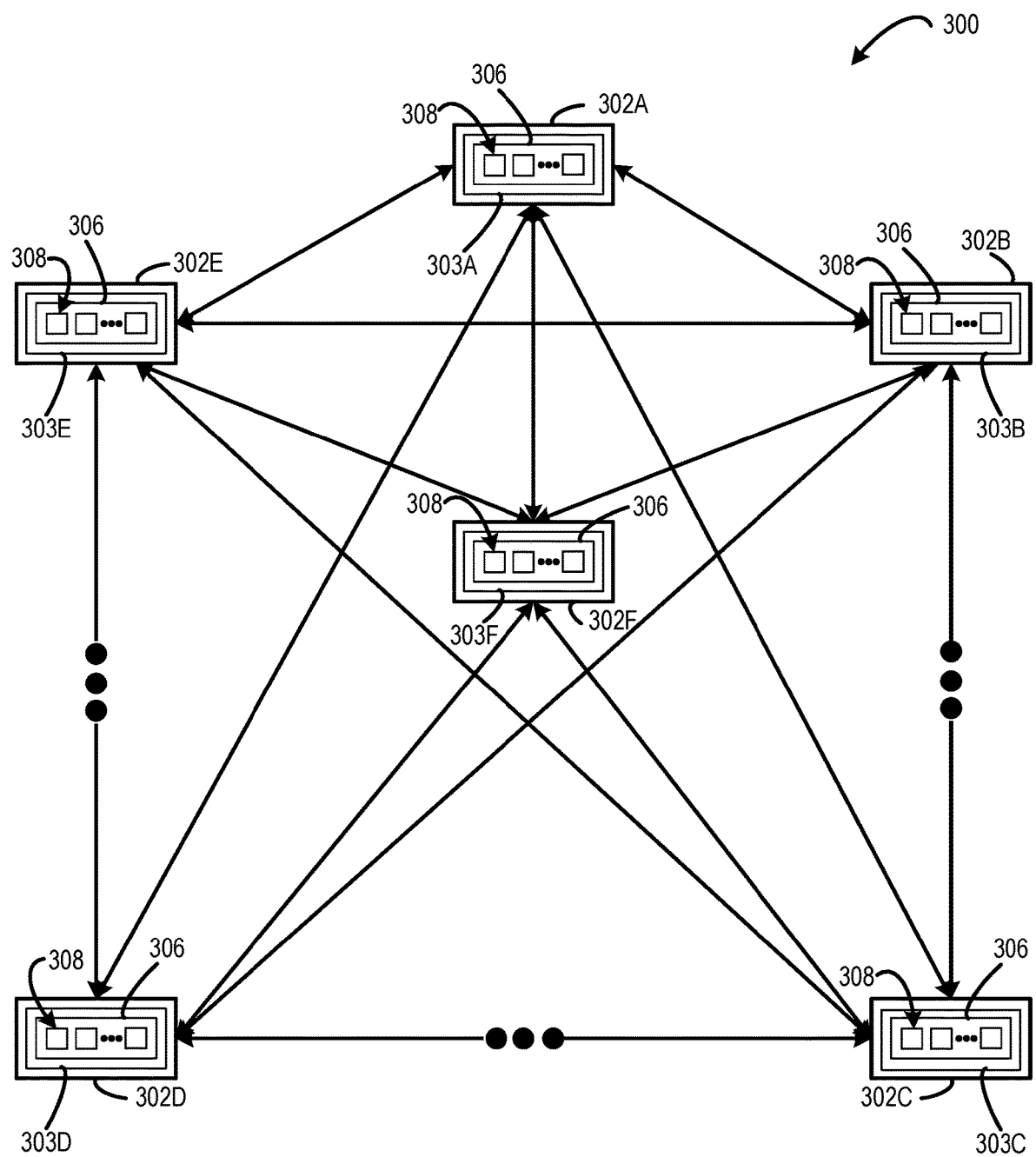
FIG. 3 schematically shows an example blockchain computer network 300 that may be used to control a distributed battery management system for monitoring and controlling operation of a plurality of batteries.

Each of the computer nodes 114A-114F is configured to store a battery management blockchain including a plurality of blocks (i.e., battery management blockchain 306 shown in FIG. 3). The blocks of the battery management blockchain include battery telemetry data (e.g., voltage, current, state-of-charge estimation, state-of-health estimation, temperature, serial number, owner, supply chain information) reported for the plurality of batteries 104. For example, the computer node 114A acquires battery telemetry data for the plurality of battery cells of the battery bank 106A during operation of the aircraft 100.

In one example, the computer node 114A adds one or more blocks that include the battery telemetry data for the plurality of battery cells of the battery bank 106A to the battery management blockchain, such that the battery telemetry data is available to all computer nodes of the distributed battery management system 112. In another example, the computer node 114A may acquire the battery telemetry data for the plurality of battery cells of the battery bank 106A and send the battery telemetry data to the computer node 114G. Further, the computer node 114G may create a block including the battery telemetry and add the block to the battery management blockchain. Here, the computer node 114G may be designated to perform operations related to maintaining the battery management blockchain without actively controlling operation of any of the plurality of batteries. Non-limiting examples of such operations include creating blocks, validating/invalidating blocks, adding blocks, and storing the battery management blockchain.

The blockchain computer network may include any suitable number of computer nodes designated for maintaining the battery management blockchain and any suitable number of computer nodes that actively control one or more batteries. In some cases, the same computer node may both maintain the battery management blockchain and actively control one or more batteries. In some examples, at least some of the battery telemetry data for one or more batteries or banks of battery cells may be reported at a repeating interval, and each time the battery telemetry data is reported it may be added in one or more blocks of the battery management blockchain. Other computer nodes may be configured to add battery telemetry data to the battery management blockchain in the same manner, such that battery telemetry data for all of the batteries 104 is available to each computer node of the distributed battery management system 112.

Continuing with the example, the computer node 114A adjusts operation of the battery cells in the battery bank 106A based on reading the battery management blockchain. Other computer nodes are configured to adjust operating parameters of the battery cells (e.g., state-of-charge, load, load balancing) in a corresponding battery bank based on reading of the battery management blockchain during operation of the aircraft 100 to provide an appropriate amount of electrical power to the pair of propulsion motors 110A, 110B and/or other electronic components of the aircraft 100. Multiple computer nodes of the distributed battery management system 112 cooperate in a coordinated manner to monitor and control the plurality of batteries 104 using the battery management blockchain. The decentralized nature of the distributed battery management system 112 protects against a single point of failure, such that even if one of the computer nodes goes offline the other computer nodes may continue operate to monitor and control the remaining battery banks.

In another example, the computer nodes 114A-114F may report battery telemetry data to the computer node 114G. The computer node 114G may store the battery management blockchain locally. Further, the computer node 114G may create and add blocks including the reported battery telemetry data to the battery management blockchain. In this example, the computer nodes 114A-114F may not store the battery management blockchain locally and instead receive battery telemetry data from the computer node 114G. Moreover, in this example, the computer nodes 114A-114G may be considered as different parts of a collective computer node or computer system for the aircraft 100. This example can be expanded to apply to different vehicles each having "on-board" computer nodes that are part of a larger blockchain computer network. Such a blockchain computer network may further include computer nodes that are not associated with any particular aircraft and are designated for maintaining the battery management blockchain.

The above-described scenario is provided as a non-limiting example. The distributed battery management system may be configured to monitor and control any suitable type of batteries. Further, the distributed battery management system may be configured to monitor and control a plurality of batteries distributed in any suitable type of vehicle application including, but not limited to, aeronautical, aerospace, marine, automotive, and industrial vehicle applications. Such vehicle applications may include human-controlled vehicles and/or autonomously-controlled robotic vehicles. Additionally, the distributed battery management system may be configured to monitor and control a plurality of batteries distributed in non-vehicle applications.

Figure 2:
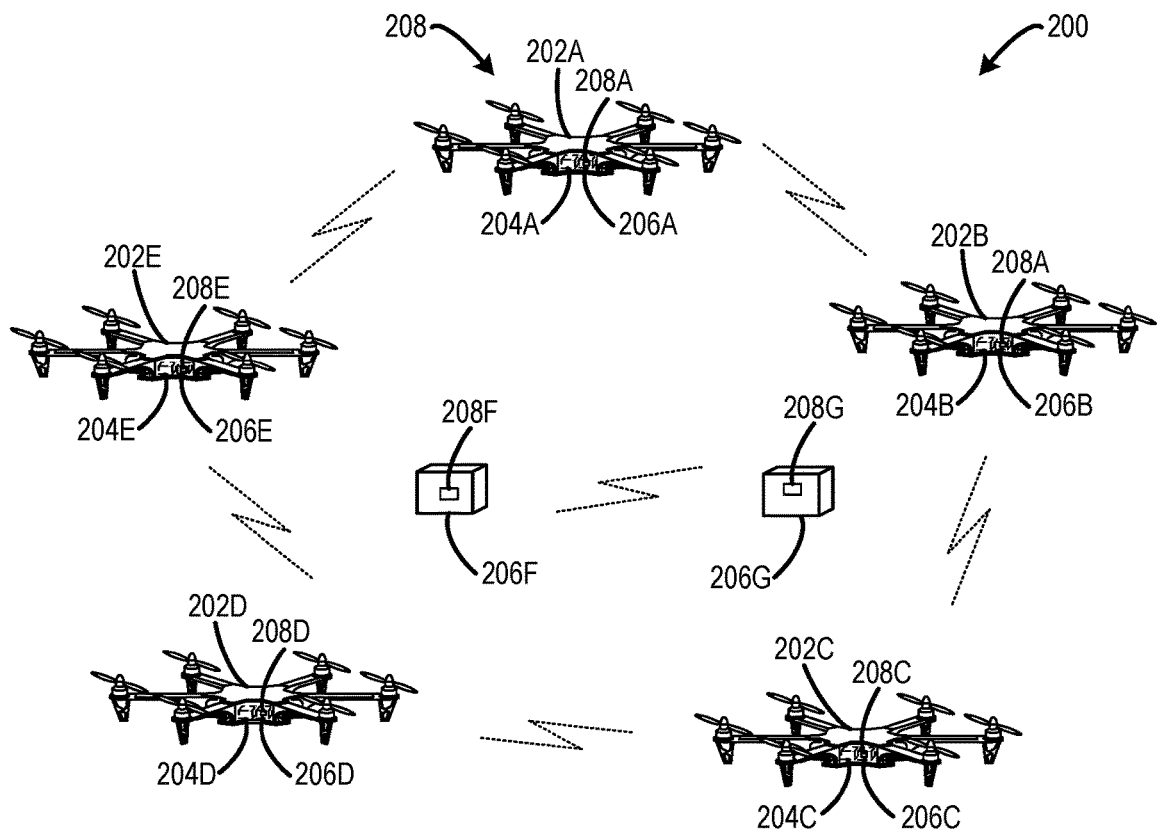
FIG. 2 schematically shows an example scenario where a distributed battery management system controls a plurality of batteries distributed throughout a fleet of vehicles.

In some embodiments, the distributed battery management system may be deployed to monitor and control a plurality of batteries distributed across a fleet of different vehicles. FIG. 2 schematically shows an example scenario where batteries are distributed across a fleet 200 of aerial vehicles. The fleet 200 of aerial vehicles includes a plurality of battery-powered aerial vehicles 202A, 202B, 202C, 202D, and 202E. Each battery-powered aerial vehicle 202 includes a battery 204 with one or more battery cells (not shown) that are monitored and controlled by an instance of distributed battery management system 208 executed by a corresponding computer node 206. A plurality of computer nodes 206A, 206B, 206C, 206D, 206E corresponding to the plurality of aerial vehicles 202A, 202B, 202C, 202D, 202E are wirelessly communicatively coupled to form a blockchain computer network (i.e., blockchain computer network 300 shown in FIG. 3). Each of the plurality of computer nodes 206A, 206B, 206C, 206D, 206E is configured to execute a corresponding instance of the battery management system 208A, 208B, 208C, 208D, 208E. Additionally, the blockchain computer network may include computer nodes 206F and 206G that are not associated with any particular battery or vehicle and are designated to perform operations related to maintaining the battery management blockchain without actively controlling operation of any of the batteries or vehicles. Computer nodes 206F and 206G are configured to execute corresponding instances of the distributed battery management system 208F and 208G. Each of the computer nodes 206A-206G is configured to store a battery management blockchain including a plurality of blocks (i.e., battery management blockchain 306 shown in FIG. 3). The blocks of the battery management blockchain include battery telemetry data reported for the plurality of batteries 204A-204E. Each of computer nodes 206A-206E adjust operation of the battery cells in the corresponding battery based on reading the battery management blockchain.

In this example scenario, computer nodes 206A-206E execute instances of the distributed battery management system 208A-208E to monitor and control operation of different batteries in different aerial vehicles during operation of the vehicle. The computer nodes provide real-time monitoring and control of the batteries as the aerial vehicles are operating. Furthermore, the battery telemetry data collected for the fleet 200 of aerial vehicles in the battery management blockchain may define an authoritative historical chronology of operation of the plurality of batteries in the different aerial vehicles. The distributed battery management system 208 may be configured to analyze the historical battery telemetry data for the plurality of batteries, predict trending behavior of the plurality of batteries based on such analysis, and adjust operating parameters of the plurality of batteries based on such predicted trending behavior. For example, the historical battery telemetry data may indicate that the plurality of batteries discharge at a higher rate over time as the batteries age. As such, the distributed battery management system 208 may compensate for the higher discharge rate by reducing a load threshold that can be placed on each battery. Additionally or alternatively, the distributed battery management system 208 may adjust other operating parameters based on such historical analysis and predictive behavior to optimize battery performance over time. The distributed battery management system 208 may adjust any suitable operating parameter(s) of the plurality of batteries based on any suitable analysis of historical battery telemetry data and predictive behavior of the plurality of batteries. The historical trended battery telemetry data collected for the whole fleet of aerial vehicles may provide a holistic view of how a large-scale number of batteries operate over time. As such, predictions about future behavior of the plurality of batteries may be robust relative to predictions made based on operation of a single battery.

In another example, the computer nodes 206A-206E may report battery telemetry data to either of computer nodes 206F and 206G. For example, the computer nodes 206F and 206G may act as different reporting stations that are placed at different locations so that aerial vehicles within range of the computer nodes can report battery telemetry data. The computer nodes 206F and 206G may store the battery management blockchain locally. Further, the computer nodes 206F and 206G may create and add blocks including the reported battery telemetry data to the battery management blockchain. In this example, the computer nodes 206A-206E may not store the battery management blockchain locally and instead receive battery telemetry data from the computer nodes 206F and/or 206.

The above-described scenario is provided as a non-limiting example. Furthermore, the distributed battery management system may be deployed to monitor and control any suitable number of batteries distributed across any suitable number of vehicles in a fleet. For example, myriad lithium battery cells (e.g., hundreds, thousands, tens-of-thousands, or more) may be arranged into battery banks within different vehicles in a fleet and these cells may be collectively managed by the distributed battery management system described herein. In other examples, such lithium cell battery banks in other non-vehicle applications may be managed by the distributed battery management system described herein.

In some embodiments, the distributed battery management system may be deployed to monitor and control a plurality of batteries in other non-vehicle applications. For example, the distributed battery management system may be configured to monitor and control a plurality of batteries distributed in a plurality of remote locations, such as batteries used for powerwalls (e.g., residential, commercial, and/or industrial backup power storage systems), uninterrupted power supplies (e.g., server farms), large-scale energy storage (e.g., to backup different power stations of an electrical grid, battery-to-grid connection), and off-grid power sources (e.g., off-grid solar farms).

Figure 4:
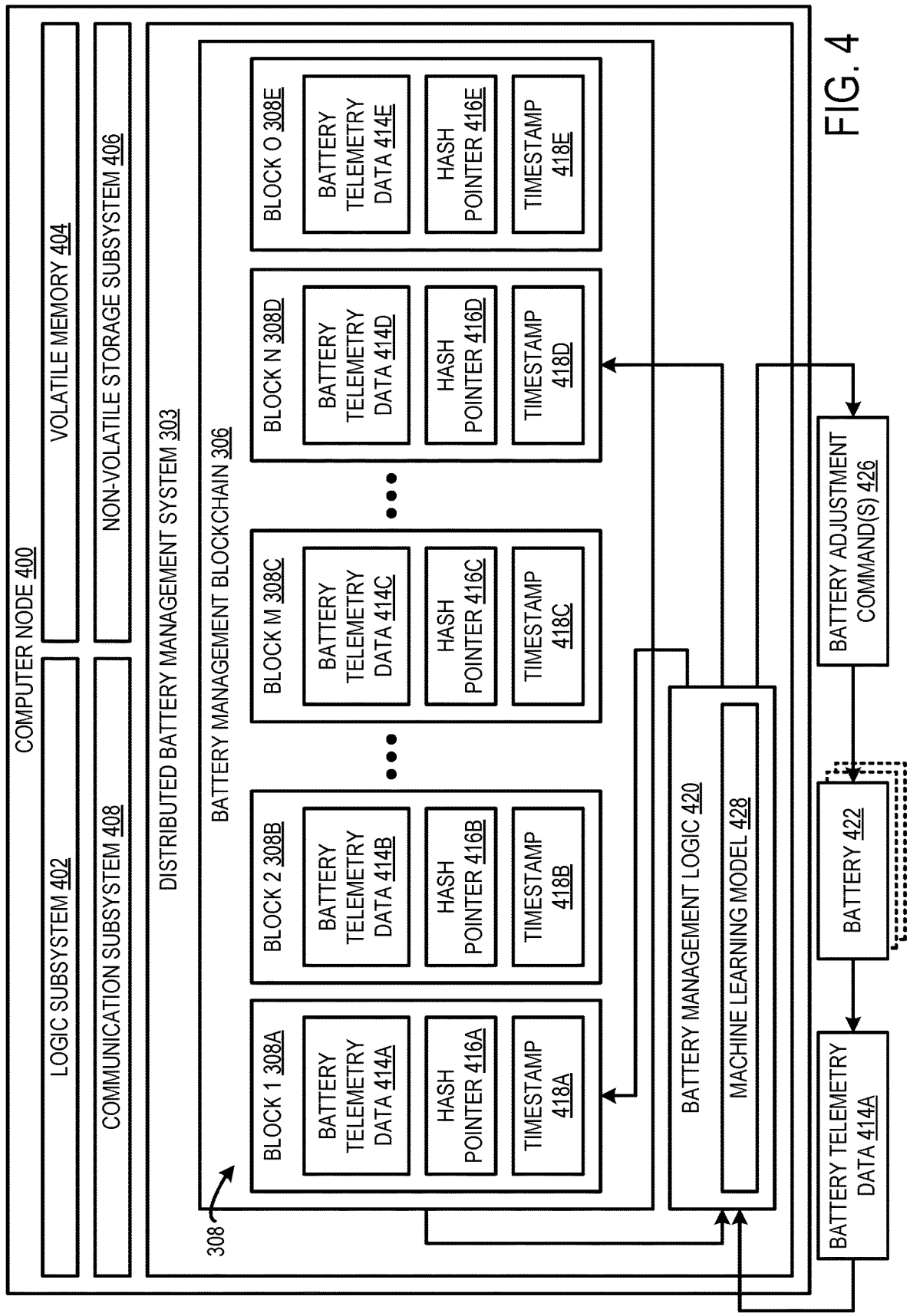
FIG. 4 schematically shows an example computer node of a blockchain computer network that controls operation of a distributed battery management system.

FIG. 3 schematically shows an example blockchain computer network 300 that is configured to execute a distributed battery management system 303 for monitoring and controlling operation of a plurality of batteries (e.g., batteries 422 shown in FIG. 4). The blockchain computer network 300 comprises a plurality of computer nodes 302A, 302B, 302C, 302D, 302E, 302F that are communicatively coupled with each other. Each computer node 302A, 302B, 302C, 302D, 302E, 302F executes a corresponding instance of the distributed battery management system 303A, 303B, 303C, 303D, 303E, 303F. In this example, six computer nodes are depicted in the blockchain computer network 300. The blockchain computer network 300 may include any suitable number of computer nodes depending on the scale of the number of batteries being managed by the distributed battery management system.

In some examples, each computer node of the plurality of computer nodes of the blockchain computer network may be designated to monitor and control one or more batteries. In some embodiments, each computer node of the plurality of computer nodes of the blockchain computer network may be configured to control operation of a different subset of batteries of the plurality of batteries. In some embodiments, two or more computer nodes may be designated to monitor and control the same battery or set of batteries to provide redundancy that makes the distributed battery management system more robust. In some examples, different computer nodes may monitor and control batteries in the same vehicle. In some examples, different computer nodes may monitor and control batteries in different vehicles. In some examples, different computer nodes may monitor and control batteries in the same location. In some examples, different computer nodes may monitor and control batteries in different remote locations. In some examples, a first set of one or more computer nodes may be designated to monitor one or more batteries and a second set of one or more computer nodes may be designated to control the same one or more batteries. Some computer nodes may provide battery monitoring functionality and other computer nodes may provide battery control functionality. In some embodiments, some computer nodes may provide other blockchain related functionality separate from battery monitoring and control. For example, some computer nodes may be configured to perform one or more of storing the battery management blockchain, creating new blocks, broadcasting blocks to other computer nodes, adding blocks to the battery management blockchain, and validating/invalidating blocks.

In some embodiments, the blockchain computer network 300 may be configured as a peer-to-peer network in which each computer node is configured to communicate directly with each other computer node of the peer-to-peer network. Since a peer-to-peer network has no central authority, if a computer node becomes unavailable the other computer nodes may remain functioning and in communication with each other to control the distributed battery management system.

The computer nodes 302A, 302B, 302C, 302D, 302E, 302F are each configured to store a battery management blockchain 306. The battery management blockchain 306 is a distributed ledger or linked list including a plurality of blocks 308. The plurality of blocks 308 include battery telemetry data for a plurality of batteries. The battery telemetry data indicates values of operating parameters, operating states, and/or control/adjustment of operation of each of the plurality of batteries. For example, the battery telemetry data for a battery may comprise a voltage, a current, a state-of-charge estimation, a state-of-health estimation, and a temperature of the battery. Battery telemetry data may further comprise a serial number, an owner, and other supply chain information. For example, the serial number of the battery may be used to determine that a battery is replaced by another battery (and further whether or not the replacement battery is an original equipment manufacturer (OEM) battery). The battery telemetry data may further indicate commands for adjusting operating parameters of a battery. For example, the battery telemetry data may include commands to adjust a load on a battery, a state-of-charge, a state-of-health, and/or a temperature of the battery. In some examples, operating parameters of two or more batteries may be adjusted to balance a state-of-charge across the two or more batteries. In other examples, operating parameters of two or more batteries may be adjusted to reduce impact of aging to one or more of the plurality of batteries. For example, the battery telemetry data may indicate temperature non-uniformity between different batteries of the plurality of batteries, and in response may adjust batteries having higher temperatures to operate at a lower current and batteries having lower temperatures to operate at a higher current in order to optimize an overall life-time of the plurality of batteries.

The plurality of batteries may be adjusted in any suitable manner by one or more of the plurality of computer nodes 302A-302F and such battery adjustments may be recorded in blocks of the battery management blockchain 306. The battery telemetry data may include parameter values and/or adjustments of parameter values for any suitable battery operating parameter.

In some embodiments, the computer nodes 302A-302F may be controlled by a trusted entity that has permission to access the battery management blockchain 306 to read information from and to submit changes to the battery management blockchain 306. Returning to the example of an aircraft, a trusted entity may include an aircraft owner, an aircraft manufacturer, a provider of maintenance and repair operations for the aircraft, an aviation regulatory authority, or another appropriate entity. Further, this example may be extended to a fleet of aircraft or other vehicles as well as other large-scale and/or non-vehicle battery applications.

In some embodiments, different computer nodes may have different levels of permissions to perform different types of battery management and/or blockchain management operations. For example, different fine-grained levels of permissions optionally may be set within the blockchain computer network to determine which computer nodes can carry out one or more of connect, send and receive battery telemetry data, adjust battery operation, create assets, streams and blocks.

In some embodiments, a large-scale battery management blockchain may be sharded or partitioned along logical lines and stored on a swarm of different physical computer that make up a computer node 302 of the blockchain computer network 300. The swarm effect reduces latency and increases speed by retrieving data in parallel from the nearest and fastest computers of the computer node.

In some embodiments, data included in the blocks of the battery management blockchain 306 may be encrypted. In some examples, block data may be encrypted using symmetric-key encryption. Any suitable symmetric-key encryption algorithm may be used to encrypt the block data. One non-limiting example includes the Advanced Encryption Standard (AES) algorithm. In other examples, block data may be encrypted using public-key (asymmetric) encryption. For examples, block data may be encrypted using digital signatures that rely on public-key encryption. To create a digital signature, the data may be input to a hashing algorithm to form a unique string of numbers that are then digitally signed using a public-key encryption algorithm (e.g., the Elliptic Curve Digital Signature Algorithm (ECDSA)) and a private key. The hash and the private key are combined using a complex mathematical formula that results in the digital signature, which can be verified with the public key. Any suitable public-key encryption algorithm may be used to encrypt the block data.

FIG. 4 schematically shows an example computer node 400 that is representative of any one of the computer nodes 302A-302F of the blockchain computer network 300 shown in FIG. 3 The computer node 400 is shown in simplified form. The computer node 400 may take the form of one or more micro-controllers, micro-computers, server computers, network computers, mobile computers, mobile communication devices, and/or another computer. Computer node 400 includes a logic subsystem 402, volatile memory 404, a non-volatile storage subsystem 406, a communication subsystem 408, and/or other components not shown in FIG. 4.

Logic subsystem 402 includes one or more physical devices configured to execute instructions. For example, the logic subsystem may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem 402 may include one or more physical processors (hardware) configured to execute software instructions. Additionally or alternatively, the logic subsystem 402 may include one or more hardware logic circuits or firmware devices configured to execute hardware-implemented logic or firmware instructions. Processors of the logic subsystem 402 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic subsystem 402 may be virtualized and executed by remotely accessible, networked computing devices configured in a cloud-computing configuration. In such a case, these virtualized aspects are run on different physical logic processors of various different machines, it will be understood.

Volatile memory 404 may include physical devices that include random access memory. Volatile memory 404 is typically utilized by the logic subsystem 402 to temporarily store information during processing of software instructions. It will be appreciated that volatile memory 404 typically does not continue to store instructions when power is cut to the volatile memory 404.

Non-volatile storage subsystem 406 includes one or more physical devices configured to hold instructions executable by the logic subsystem to implement the methods and processes described herein. When such methods and processes are implemented, the state of non-volatile storage subsystem 406 may be transformed e.g., to hold different data.

Non-volatile storage subsystem 406 may include physical devices that are removable and/or built in. Non-volatile storage subsystem 406 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage subsystem 406 may include nonvolatile, dynamic, static, read/write, read-only, sequential-access, location-addressable, file-addressable, and/or content-addressable devices. It will be appreciated that non-volatile storage subsystem 406 is configured to hold instructions even when power is cut to the non-volatile storage subsystem 406.

Aspects of logic subsystem 402, volatile memory 404, and non-volatile storage subsystem 406 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The communication subsystem 408 may be configured to communicatively couple various computing devices described herein with each other, and with other devices. The communication subsystem 408 may include wired and/or wireless communication devices compatible with one or more different communication protocols. As non-limiting examples, the communication subsystem 408 may be configured for communication via a wireless telephone network, or a wired or wireless local- or wide-area network, such as a HDMI over Wi-Fi connection. In some embodiments, the communication subsystem may allow computer node 400 to send and/or receive messages to and/or from other devices via a network such as the Internet.

The computer node 400 is configured to execute an instance or portion of the distributed battery management system 303 (also shown in FIG. 3). The distributed battery management system 303 may include software, firmware, or a combination thereof. The computer node 400 is configured to store the battery management blockchain 306 (also shown in FIG. 3) in the volatile memory 404 and/or the non-volatile storage subsystem 406. The battery management blockchain 306 includes a plurality of blocks 308 (e.g., 308A, 308B, 308C, 308D, 308E). Each block 308 includes some form of data 414 (e.g., 414A, 414B, 414C, 414D, 414E), a hash pointer 416 (e.g., (e.g., 416A, 416B, 416C, 416D, 416E), and a timestamp 418 (e.g., 418A, 418B, 418C, 418D, 418E). The data 414 is related to the distributed battery management system 303. In some examples, the data 414 may include battery telemetry data for one or more batteries. In other examples, the data 414 may include other forms of data related to operation of the plurality of batteries, the battery management blockchain, and/or the distributed battery management system. Each hash pointer 416 includes an address of a previous block in the battery management blockchain 306 and a hash of the data inside the previous block in the battery management blockchain 306. Each timestamp 418 indicates a time at which the corresponding block is added to the battery management blockchain 306. Since the blocks 308 of the battery management blockchain 306 are linked in this manner, the battery management blockchain 306 may maintain a secure and immutable full historical record of the battery telemetry data and any data that is communicated between the different computer nodes of the blockchain computer network.

Since the battery management blockchain 306 can be modified directly by multiple writers (i.e., different computer nodes) that are fully independent of each other, the battery management blockchain 306 may be governed by rules that restrict the transactions performed to modify the battery management blockchain 306. Such rules are fundamentally different from normal constraints that appear in traditional battery management systems because they relate directly to the legitimacy of transformations in addition to the accuracy of data written to the battery management blockchain 306. Every transaction/interaction is checked against these rules by every computer node in the blockchain computer network, and transactions that fail are rejected and not relayed on to the next computer node.

In the illustrated example, the battery management blockchain 306 includes a first block 308A. Note that the first block 308A is the first illustrated block in the battery management blockchain 306. The battery management blockchain 306 may include other less relevant blocks ahead of the first block 308A in the battery management blockchain 306, such as a genesis block, however such blocks are not shown. The first block 308A includes battery telemetry data 414A for a first subset of one or more batteries reported by a first computer node. The first block 308A may be created by the first computer node and broadcast to other computer nodes in the blockchain computer network. The other computer nodes may either validate or invalidate the first block 308A. Once the first block 308A has been validated by a consensus of the computer nodes of the blockchain computer network, the first block is added to the battery management blockchain 306.

A block may be validated for inclusion in the battery management blockchain 306 using any suitable validation approach. Non-limiting examples include proof-of-work, proof-of-stake, proof-of-burn, proof-of-capacity, and proof-of-elapsed time validation approaches. Such validation approaches may be used to confirm and arbitrate all transactions in order to prevent data conflicts between two or more writers to the battery management blockchain 306. In this way, the battery management blockchain 306 provides an authoritative final transaction log which includes all previous data in a secure and immutable record.

Returning to the illustrated example, a second block 308B follows the first block 308A in the blockchain. The second block 308B includes battery telemetry data 414B for a second subset of one or more batteries reported by a second computer node. The second block 308B further includes a hash pointer 416B that includes an address of the first block 308A and a hash of the data 414A inside the first block 308A. The second block 308B includes a timestamp 418B that occurs at a later time than the timestamp 418A of the first block 308A since the second block 308B follows the first block 308A in the battery management blockchain 306.

The battery management blockchain 306 may further include blocks that store telemetry data for each battery that is monitored and controlled by the distributed battery management system 303 up to M batteries, such that an $M^{th}$ block 308C is included in the blockchain 306. The $M^{th}$ block 308C may include battery telemetry data 414C reported for the $M^{th}$ battery, a hash pointer 416C that points to the preceding block in the blockchain, and a timestamp 418C. In some examples, battery telemetry data for a plurality of batteries may be stored in the same block of the blockchain. As one example, a computer node may monitor operation of a plurality of batteries and battery telemetry data for the plurality of batteries may be included in the same block in the blockchain. In some examples, the battery telemetry data for the plurality of batteries may be reported at a repeating interval, and each time the battery telemetry data for the plurality of batteries is reported, such battery telemetry data is included in blocks of the battery management blockchain 306.

In some embodiments, each transaction that adds a block to the battery management blockchain 306 optionally may require a cryptographic signature for the data stored in the block. The cryptographic signature may be validated as part of the validation process for the block. The use of a cryptographic signature may ensure that the data in the block is not corrupt or tampered with, without needing to access the data itself for inspection and validation.

The computer node 400 includes battery management logic 420 that is configured to monitor and control operation of one or more batteries 422. The battery management logic 420 may be configured to receive battery telemetry data 414A for the one or more batteries 422. The battery telemetry data 414A indicates values of operating parameters and/or operating states of the one or more batteries 422. For example, the battery telemetry data may comprise a voltage, a current, a state-of-charge estimation, a state-of-health estimation, a temperature, a serial number, an owner, and supply chain information of each of the batteries. The battery telemetry data 414A may include parameter values for any suitable battery operating parameter. The battery management logic 420 may be configured to create the first block 308A that includes the reported battery telemetry data 414A in the battery management blockchain 306 responsive to receive the battery telemetry data 414A. The battery management logic 420 may be further configured to read the battery management blockchain 306 and adjust one or more operating parameter(s) of the one or more batteries 422 based on such computer-reading of the battery management blockchain 306. Such adjustment may be issued to the one or more batteries 422 as one or more battery adjustment commands 426. Non-limiting examples of the command(s) 426 may include adjusting a load on a battery, a state-of-charge, a state-of-health, and/or a temperature of the battery. In some examples, operating parameters of two or more batteries may be adjusted to balance a state-of-charge across the two or more batteries. In some examples, such load balancing may be performed by a single computer node. In other examples, two or more computer nodes may adjust operating parameters of different batteries in a coordinated manner to achieve load balancing. The one or more batteries 422 may be adjusted in any suitable manner by the battery management logic 420.

In some examples, the battery management logic 420 may be configured to adjust the operating parameter(s) of the one or more batteries 422 according to operating rules or thresholds set for the one or more batteries 422. For example, the rules may specify temperature, voltage, current, state-ofcharge, and state-of-health other thresholds for the one or more batteries 422 and the battery management logic 420 may adjust the operating parameter(s) of the one or more batteries 422 to stay within such threshold.

Furthermore, the battery management logic 420 may be configured to create a new $N^{th}$ block 308D in the battery management blockchain 306 that indicates the adjustment of the operating parameter(s) of the one or more batteries. The $N^{th}$ block 308D include battery telemetry data 414D indicating the battery adjustment command(s) 426, a hash pointer 416D, and a timestamp 418D. The computer node 400 may be configured to broadcast the $N^{th}$ block 308D to other computer nodes in the blockchain computer network for validation. The computer node 400 may add the $N^{th}$ block 308D to the battery management blockchain 306 based on validation of the new block by a consensus of the plurality of computer nodes of the blockchain computer network.

In some embodiments, the battery management logic 420 may be configured to perform trended analysis of the battery telemetry data aggregated over time for the plurality of batteries managed by the distributed battery management system 303 based on reading the battery management blockchain 306. Trended analysis may include determining how the batteries operate over time due to aging and/or based on operational rules set of the batteries. The battery management logic 420 may be configured to adjust operation of the batteries based on such trended analysis in order to optimize performance of the batteries as the batteries age. Alternatively or additionally, the battery management logic 420 may be configured to adjust any operational rules (e.g., operating parameter threshold, load balancing approaches) based on such trended analysis in order to optimize performance of the batteries.

In some embodiments, operational rules may be set to restrict transactions that are performed by different computer nodes since each of the computer nodes operates independently. Such operational rules may ensure that transactions (e.g., adjustments to battery operation) performed by different computer nodes do not conflict with each other. These rules are fundamentally different from the normal constraints that appear in traditional battery management systems because these rules relate directly to the legitimacy of transformations of the battery management blockchain in addition to the accuracy of control of the batteries. Every transaction/interaction associated with the battery management blockchain may be checked against the rules by every node in the blockchain computer network, and those transactions/interactions that fail the rules are rejected and not relayed on to the other computer nodes. Such operational rules provide limits that facilitate safe battery operation and maximizes battery performance, health, and life.

In some embodiments, the battery management logic 420 may include a machine learning model 428 configured to determine a desired operating state of the one or more batteries 422 based on data stored in the battery management blockchain 306. Additionally, the machine learning model 428 may be configured to provide battery adjustment commands 426 to achieve the desired operating state of the one or more batteries 422. The machine-learning model 428 may be previously trained on battery telemetry data and operating states of batteries under different operating conditions to determine the desired operating state of the one or more batteries 422.

The machine-learning model 428 can employ any suitable combination of state-of-the-art and/or artificial intelligence (AI) techniques, including machine learning (ML) techniques, to determine the desired operating state of the one or more batteries 422. Examples of such techniques include convolutional neural networks (e.g., including spatial convolutional networks for processing images and/or videos), multi-layer neural networks, recurrent neural networks (e.g., long short-term memory networks), support vector machines, associative memories (e.g., lookup tables, hash tables, Bloom Filters, Neural Turing Machine and/or Neural Random Access Memory), unsupervised spatial and/or clustering methods (e.g., nearest neighbor algorithms, topological data analysis, and/or k-means clustering) and/or graphical models (e.g., Markov models, conditional random fields, and/or AI knowledge bases).

The machine-learning model 428 can be trained using any suitable training procedure. Non-limiting examples of training procedures for the machine-learning model 428 include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or based on generative adversarial neural network training methods.

In some embodiments, the distributed battery management system 303 may be extensible such that batteries may be added, removed, and/or replaced with different batteries. For example, in the illustrated embodiment, in response to a new battery being added to the distributed battery management system 303. An $O^{th}$ block 308E may be created by the computer node and broadcast to other computer nodes in the blockchain computer network. The other computer nodes may either validate or invalidate the $O^{th}$ block 308E. Once the $O^{th}$ block 308E has been validated by a consensus of the computer nodes of the blockchain computer network, the $O^{th}$ block 308E is added to the battery management blockchain 306. Similar operations may be performed to remove a battery or replace a battery with a different battery in the distributed battery management system 303.

Figure 5A:
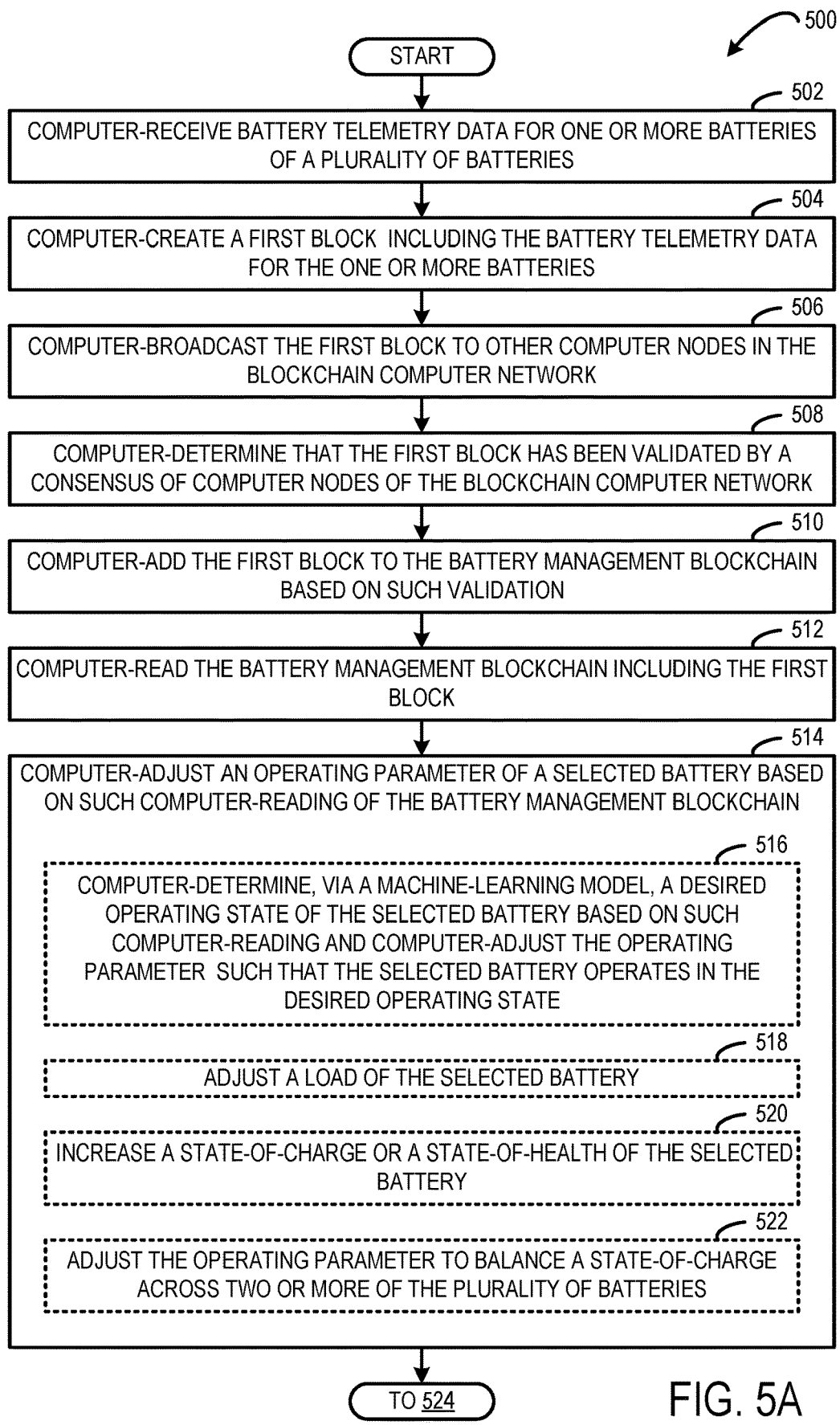
FIGS. 5A and 5B show a flowchart of an example method for operating a distributed battery management system comprising a plurality of batteries.
Figure 5B:
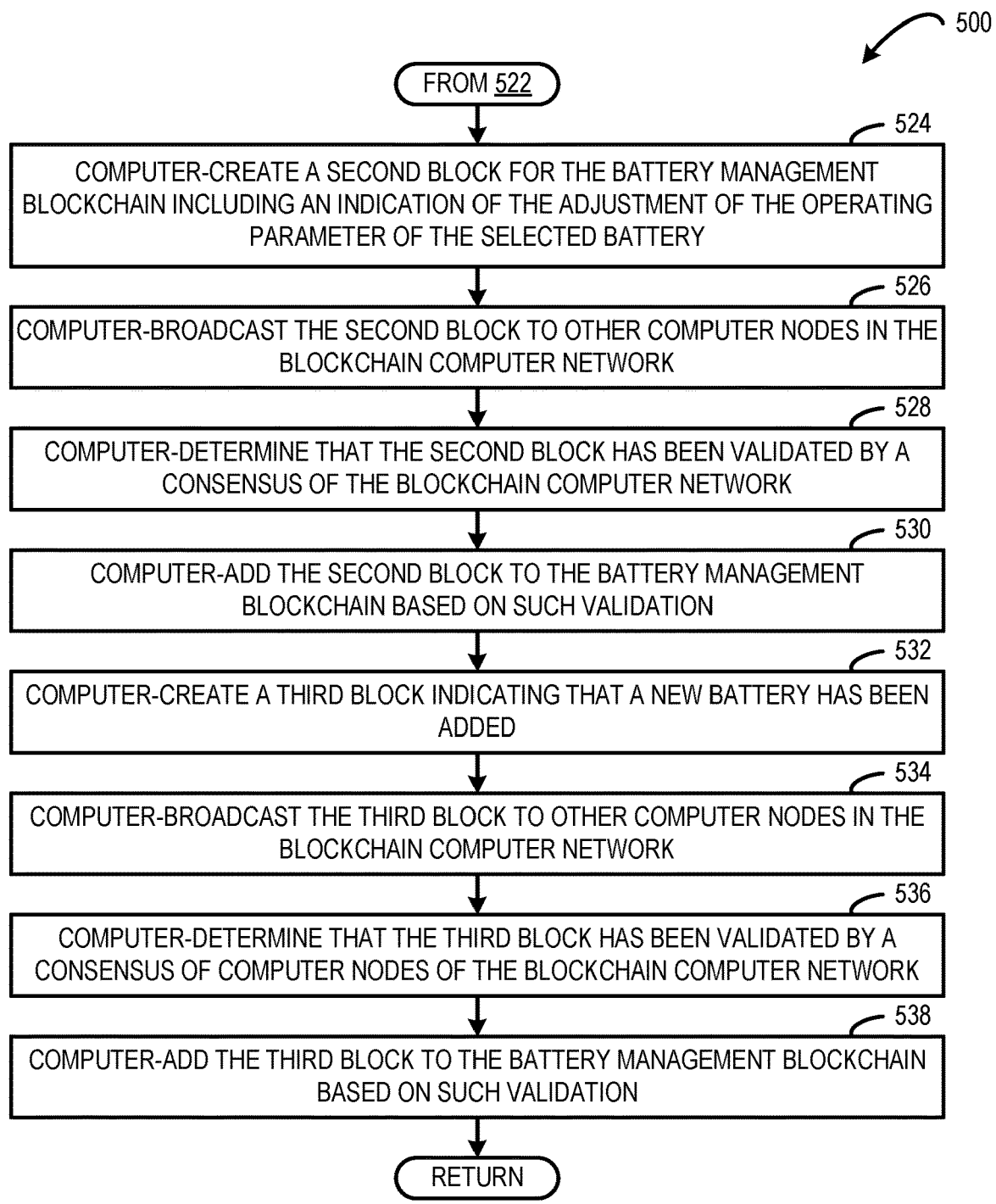

FIGS. 5A and 5B show a flowchart of an example method for operating a distributed battery management system for a plurality of batteries. For example, any of the computer nodes 114A-114G shown in FIG. 1, any of the computer nodes 206A-206G shown in FIG. 2, any of the computer nodes 302A-302F shown in FIG. 3 and the computer node 400 shown in FIG. 4 may be configured to perform the method 500. In FIG. 5A, at 502, the method 500 includes computer-receiving battery telemetry data for one or more batteries of the plurality of batteries at a computer node of a blockchain computer network. The computer node is configured to store a battery management blockchain comprising a plurality of blocks that includes battery telemetry data for the plurality of batteries. At 504, the method includes computer-creating a first block for the battery management blockchain. The first block includes the battery telemetry data for the one or more batteries. At 506, the method 500 includes computer-broadcasting the first block to other computer nodes in the blockchain computer network. The other computer nodes may either validate or invalidate the first block. Such validation may be performed using any suitable validation approach. At 508, the method 500 includes computer-determining that the first block has been validated by a consensus of the computer nodes of the blockchain computer network. At 510, the method 500 includes computer-adding the first block to the battery management blockchain based on validation of the first block by the consensus of the computer nodes of the blockchain computer network. If the first block were not to meet the consensus, then the first block would not be added to the battery management blockchain. At 512, the method 500 includes computer-reading the battery management blockchain including the first block.

At 514, the method 500 includes computer-adjusting an operating parameter of a selected battery of the plurality of batteries based on such computer-reading of the battery management blockchain.

In some examples, the operating parameter may be adjusted based on battery telemetry data for a single battery. In other examples, the operating parameter may be adjusted based on battery telemetry data for a plurality of batteries. In some embodiments, the operating parameter may be adjusted based on trended analysis of battery telemetry data aggregated for the plurality of batteries over time.

In some embodiments, at 516, the method 500 optionally may include computer-determining, via a machine-learning model, a desired operating state of the selected battery based on such computer-reading of the battery management blockchain, and computer adjusting the operating parameter such that the selected battery operates in the desired operating state. In some embodiments, at 518, the method 500 optionally may include adjusting a load of the selected battery based on such computer-reading of the battery management blockchain. In some embodiments, at 520, the method 500 optionally may include increasing a state-of-charge or a state-of-health of the selected battery based on such computer-reading of the battery management blockchain. In some embodiments, at 522, the method 500 optionally may include computer-adjusting the operating parameter to balance a state-of-charge across two or more of the plurality of batteries or computer-adjusting the operating parameter to reduce impact of aging to one or more of the plurality of batteries.

In FIG. 5B, at 524, the method 500 includes computer-creating a second block for the battery management blockchain. The second block includes an indication of the adjustment of the operating parameter of the selected battery. At 526, the method 500 includes computer-broadcasting the second block to other computer nodes in the blockchain computer network. The other computer nodes may either validate or invalidate the second block. Such validation may be performed using any suitable validation approach. At 528, the method 500 includes computer-determining that the second block has been validated by a consensus of the plurality of computer nodes of the blockchain computer network. At 530, the method 500 includes computer-adding the second block to the battery management blockchain stored at the computer node based on validation of the second block by the consensus of the plurality of computer nodes of the blockchain computer network. Once the second block is added to the battery management blockchain, the data stored in the second block may be available to all computer nodes in the blockchain computer network and may be used for monitoring and control of the plurality of batteries.

At 532, the method 500 includes computer-creating a third block for the battery management blockchain in response to a new battery being added to the distributed battery management system. The third block includes an indication that the new battery is added to the distributed battery management system. At 534, the method 500 includes computer-broadcasting the third block to other computer nodes in the blockchain computer network. The other computer nodes may either validate or invalidate the third block. Such validation may be performed using any suitable validation approach. At 534, the method 500 includes computer-determining that the third block has been validated by a consensus of the plurality of computer nodes of the blockchain computer network. At 536, the method 500 includes computer-adding the third block to the battery management blockchain based on validation of the third block by the consensus of the computer nodes of the blockchain computer network. Once the third block is added to the battery management blockchain, the data stored in the third block may be available to all computer nodes in the blockchain computer network. Similar steps may be performed to remove a battery or replace a battery with a different battery, so that such information may be stored in the battery management blockchain.

The above-described method may be performed repeatedly to update reported telemetry data for the plurality of batteries in the battery management blockchain. Moreover, the above-described method enables the plurality of computer nodes of the blockchain computer network to collectively provide distributed control of the plurality of batteries since each computer node has a full historical record of operation of the batteries embodied by the battery management blockchain. In some embodiments, different computer nodes may perform different steps of the method while not performing other steps of the method. For example, one computer node may store and maintain the battery management blockchain and another computer node may read the battery management blockchain and adjust operation of a selected battery. In other embodiments, the same computer node may store and maintain the battery management blockchain as well as read the battery management blockchain and adjust operation of a selected battery.

In an example, a computer-implemented method for operating a distributed battery management system for a plurality of batteries comprises computer-reading a battery management blockchain stored at a computer node of a blockchain computer network comprising a plurality of computer nodes, each configured to store the battery management blockchain, wherein the battery management blockchain comprises a plurality of blocks that includes battery telemetry data for the plurality of batteries, and computer-adjusting an operating parameter of a selected battery of the plurality of batteries based on such computer-reading of the battery management blockchain. In this example and/or other examples, the method may further comprise computer-creating a new block for the battery management blockchain, the new block including an indication of the adjustment of the operating parameter of the selected battery, computer-broadcasting the new block to other computer nodes in the blockchain computer network, computer-determining that the new block has been validated by a consensus of the plurality of computer nodes of the blockchain computer network, and computer-adding the new block to the battery management blockchain stored at the computer node based on validation of the new block by the consensus of the plurality of computer nodes of the blockchain computer network. In this example and/or other examples, the method may further comprise computer-receiving battery telemetry data for one or more batteries of the plurality of batteries, computer-creating a new block for the battery management blockchain, the new block including such battery telemetry data, computer-broadcasting the new block to other computer nodes in the blockchain computer network, computer-determining that the new block has been validated by a consensus of the plurality of computer nodes of the blockchain computer network, and computer-adding the new block to the battery management blockchain stored at the computer node based on validation of the new block by the consensus of the plurality of computer nodes of the blockchain computer network. In this example and/or other examples, the method may further comprise computer-adjusting an operating parameter of each of the plurality of batteries based on the battery management blockchain. In this example and/or other examples, each computer node of the plurality of computer nodes of the blockchain computer network may be configured to control operation of a different subset of batteries of the plurality of batteries. In this example and/or other examples, the battery telemetry data for the plurality of batteries may be reported at a repeating interval, and each time the battery telemetry data for the plurality of batteries is reported, such battery telemetry data may be included in blocks of the battery management blockchain. In this example and/or other examples, the battery telemetry data for a battery of the plurality of batteries may comprise a voltage, a current, a state-of-charge estimation, a state-of-health estimation, a temperature, a serial number, an owner, and supply chain information of the battery. In this example and/or other examples, computer-adjusting an operating parameter of a selected battery may comprise at least one of adjusting a load of the selected battery and increasing a state-of-charge or a state-of-health of the selected battery. In this example and/or other examples, the operating parameter may be computer-adjusted to balance a state-of-charge across two or more of the plurality of batteries. In this example and/or other examples, the plurality of batteries may be distributed across a vehicle, the battery telemetry data for the plurality of batteries may be reported during operation of the vehicle, and such computer-adjusting may be performed during operation of the vehicle. In this example and/or other examples, the plurality of batteries may be distributed across at least one of a fleet of vehicles, and a plurality of remote locations. In this example and/or other examples, adjusting an operating parameter of a selected battery may comprise computer-determining, via a machine-learning model, a desired operating state of the selected battery, and wherein the operating parameter is computer-adjusted such that the selected battery operates in the desired operating state.

In another example, a computer comprises a logic subsystem, a storage subsystem comprising instructions executable by the logic subsystem to computer-store a battery management blockchain stored at the storage subsystem, wherein the computer is configured to operate as a computer node of a blockchain computer network having a plurality of computer nodes, wherein the blockchain computer network is configured to operate a distributed battery management system for a plurality of batteries, wherein each computer node is configured to store the battery management blockchain, wherein the battery management blockchain comprises a plurality of blocks that includes battery telemetry data for the plurality of batteries, computer-receive battery telemetry data for one or more batteries of the plurality of batteries, computer-create a new block for the battery management blockchain, the new block including such battery telemetry data, computer-broadcast the new block to other computer nodes in the blockchain computer network, computer-determine that the new block has been validated by a consensus of the plurality of computer nodes of the blockchain computer network, and computer-add the new block to the battery management blockchain stored at the storage subsystem based on validation of the new block by the consensus of the plurality of computer nodes of the blockchain computer network. In this example and/or other examples, the instructions may be further executable by the logic subsystem to computer-adjust an operating parameter of a selected battery of the plurality of batteries based on such computer-reading of the battery management blockchain. In this example and/or other examples, the instructions may be further executable by the logic subsystem to computer-create a new block for the battery management blockchain, the new block including an indication of the adjustment of the operating parameter of the selected battery, computer-broadcast the new block to other computer nodes in the blockchain computer network, computer-determine that the new block has been validated by a consensus of the plurality of computer nodes of the blockchain computer network, and computer-add the new block to the battery management blockchain stored at the storage subsystem based on validation of the new block by the consensus of the plurality of computer nodes of the blockchain computer network. In this example and/or other examples, the instructions may be further executable by the logic subsystem to computer-adjust an operating parameter of each of the plurality of batteries based on the battery management blockchain. In this example and/or other examples, each computer node of the plurality of computer nodes of the blockchain computer network may be configured to control operation of a different subset of batteries of the plurality of batteries. In this example and/or other examples, the battery telemetry data for the plurality of batteries may be reported at a repeating interval, and each time the battery telemetry data for the plurality of batteries is reported, such battery telemetry data may be included in blocks of the battery management blockchain. In this example and/or other examples, the battery telemetry data for a battery of the plurality of batteries may comprise one or more of a voltage, a current, a state-of-charge estimation, a state-of-health estimation, a temperature, a serial number, an owner, and supply chain information of the battery.

In yet another example, a computer-implemented method for operating a distributed battery management system for a plurality of batteries comprises computer-receiving battery telemetry data for one or more batteries of the plurality of batteries at a computer node of a blockchain computer network having a plurality of computer nodes, each configured to store a battery management blockchain having a plurality of blocks that includes battery telemetry data for the plurality of batteries, computer-creating a first block for the battery management blockchain stored at the computer node, the first block including the battery telemetry data for the one or more batteries, computer-broadcasting the first block to other computer nodes in the blockchain computer network, computer-determining that the first block has been validated by a consensus of the plurality of computer nodes of the blockchain computer network, computer-adding the first block to the battery management blockchain stored at the computer node based on validation of the first block by the consensus of the plurality of computer nodes of the blockchain computer network, computer-reading the battery management blockchain including the first block, computer-adjusting an operating parameter of a selected battery of the plurality of batteries based on such computer-reading of the battery management blockchain including the first block, computer-creating a second block for the battery management blockchain, the second block including an indication of the adjustment of the operating parameter of the selected battery, computer-broadcasting the second block to other computer nodes in the blockchain computer network, computer-determining that the second block has been validated by a consensus of the plurality of computer nodes of the blockchain computer network, and computer-adding the second block to the battery management blockchain stored at the computer node based on validation of the second block by the consensus of the plurality of computer nodes of the blockchain computer network.

The present disclosure includes all novel and non-obvious combinations and subcombinations of the various features and techniques disclosed herein. The various features and techniques disclosed herein are not necessarily required of all examples of the present disclosure. Furthermore, the various features and techniques disclosed herein may define patentable subject matter apart from the disclosed examples and may find utility in other implementations not expressly disclosed herein.

The invention claimed is:

1. A computer-implemented method for operating a distributed battery management system for a plurality of batteries, the method comprising:
   computer-reading a battery management blockchain stored at a computer node of a blockchain computer network comprising a plurality of computer nodes, wherein each computer node of the plurality of computer nodes of the blockchain computer network is configured to control operation of a different subset of multiple batteries of the plurality of batteries of the distributed battery management system, the computer node configured to store the battery management blockchain, wherein the battery management blockchain comprises a plurality of blocks that includes battery telemetry data for the plurality of batteries; and
   computer-adjusting an operating parameter of a selected battery of the subset of multiple batteries controlled by the computer node based on such computer-reading of the battery management blockchain.

2. The method of claim 1, further comprising:
   computer-creating a new block for the battery management blockchain, the new block including an indication of the adjustment of the operating parameter of the selected battery;
   computer-broadcasting the new block to other computer nodes in the blockchain computer network;
   computer-determining that the new block has been validated by a consensus of the plurality of computer nodes of the blockchain computer network; and
   computer-adding the new block to the battery management blockchain stored at the computer node based on validation of the new block by the consensus of the plurality of computer nodes of the blockchain computer network.

3. The method of claim 1, further comprising:
   computer-receiving battery telemetry data for one or more batteries of the plurality of batteries;
   computer-creating a new block for the battery management blockchain, the new block including such battery telemetry data;
   computer-broadcasting the new block to other computer nodes in the blockchain computer network;
   computer-determining that the new block has been validated by a consensus of the plurality of computer nodes of the blockchain computer network; and
   computer-adding the new block to the battery management blockchain stored at the computer node based on validation of the new block by the consensus of the plurality of computer nodes of the blockchain computer network.

4. The method of claim 1, further comprising:
   computer-adjusting an operating parameter of each of the subset of multiple batteries controlled by the computer node based on such computer reading of the battery management blockchain.

5. The method of claim 1, wherein the battery telemetry data for the plurality of batteries is reported at a repeating interval, and wherein each time the battery telemetry data for the plurality of batteries is reported, such battery telemetry data is included in blocks of the battery management blockchain.

6. The method of claim 1, wherein the battery telemetry data for a battery of the plurality of batteries comprises one or more of a voltage, a current, a state-of-charge estimation, a state-of-health estimation, a temperature, a serial number, an owner, and supply chain information of the battery.

7. The method of claim 1, wherein computer-adjusting an operating parameter of a selected battery comprises at least one of adjusting a load of the selected battery, increasing a state-of-charge or a state-of-health of the selected battery, and adjusting the operating parameter to balance a state-of-charge across two or more of the plurality of batteries.

8. The method of claim 1, further comprising:
   computer-creating a new block for the battery management blockchain in response to a new battery being added to the distributed battery management system, the new block indicating that the new battery is added;
   computer-broadcasting the new block to other computer nodes in the blockchain computer network;
   computer-determining that the new block has been validated by a consensus of the plurality of computer nodes of the blockchain computer network; and
   computer-adding the new block to the battery management blockchain stored at the computer node based on validation of the new block by the consensus of the plurality of computer nodes of the blockchain computer network.

9. The method of claim 1, wherein the plurality of batteries is distributed across a vehicle, wherein the battery telemetry data for the plurality of batteries is reported during operation of the vehicle, and wherein such computer-adjusting is performed during operation of the vehicle.

10. The method of claim 1, wherein the plurality of batteries is distributed across at least one of a fleet of vehicles, and a plurality of remote locations.

11. The method of claim 1, wherein adjusting an operating parameter of a selected battery comprises computer-determining, via a machine-learning model, a desired operating state of the selected battery, and wherein the operating parameter is computer-adjusted such that the selected battery operates in the desired operating state.

12. The method of claim 1, further comprising:
   based on the computer node becoming unavailable, assigning a different computing node of the blockchain computer network to control the subset of multiple batteries based on reading the battery management blockchain.

13. A computer comprising:
   a logic subsystem;
   a storage subsystem comprising instructions executable by the logic subsystem to:
      computer-store a battery management blockchain stored at the storage subsystem, wherein the computer is configured to operate as a computer node of a blockchain computer network having a plurality of computer nodes, wherein the blockchain computer network is configured to operate a distributed battery management system for a plurality of batteries, wherein each computer node of the plurality of computer nodes of the blockchain computer network is configured to control operation of a different subset of multiple batteries of the plurality of batteries of the distributed battery management system, wherein each computer node is configured to store the battery management blockchain, wherein the battery management blockchain comprises a plurality of blocks that includes battery telemetry data for the plurality of batteries;
computer-receive battery telemetry data for one or more batteries of the subset of multiple batteries controlled by the computer node;
computer-create a new block for the battery management blockchain, the new block including such battery telemetry data;
computer-broadcast the new block to other computer nodes in the blockchain computer network;
computer-determine that the new block has been validated by a consensus of the plurality of computer nodes of the blockchain computer network;
computer-add the new block to the battery management blockchain stored at the storage subsystem based on validation of the new block by the consensus of the plurality of computer nodes of the blockchain computer network;
computer-read the battery management blockchain to obtain the telemetry data for the one or more batteries stored in the new block; and
computer-adjust an operating parameter of a selected battery of the subset of multiple batteries controlled by the computer node based on such computer-reading of the battery management blockchain.

14. The computer of claim 1, wherein the instructions are further executable by the logic subsystem to:
computer-create a new block for the battery management blockchain, the new block including an indication of the adjustment of the operating parameter of the selected battery;
computer-broadcast the new block to other computer nodes in the blockchain computer network;
computer-determine that the new block has been validated by a consensus of the plurality of computer nodes of the blockchain computer network; and
computer-add the new block to the battery management blockchain stored at the storage subsystem based on validation of the new block by the consensus of the plurality of computer nodes of the blockchain computer network.

15. The computer of claim 13, wherein the instructions are further executable by the logic subsystem to:
computer-adjust an operating parameter of each of the subset of multiple batteries controlled by the computer node based on such computer reading of the battery management blockchain.

16. The computer of claim 13, wherein the battery telemetry data for the plurality of batteries is reported at a repeating interval, and wherein each time the battery telemetry data for the plurality of batteries is reported, such battery telemetry data is included in blocks of the battery management blockchain.

17. The computer of claim 13, wherein the battery telemetry data for a battery of the plurality of batteries comprises one or more of a voltage, a current, a state-of-charge estimation, a state-of-health estimation, a temperature, a serial number, an owner, and supply chain information of the battery.

18. The computer of claim 13, wherein the storage subsystem comprises instructions executable by the logic subsystem to:
based on the computer node becoming unavailable, assign a different computing node of the blockchain computer network to control the subset of multiple batteries based on reading the battery management blockchain.

19. A computer-implemented method for operating a distributed battery management system for a plurality of batteries, the method comprising:
computer-receiving battery telemetry data for one or more batteries of the plurality of batteries at a computer node of a blockchain computer network having a plurality of computer nodes, wherein each computer node of the plurality of computer nodes of the blockchain computer network is configured to control operation of a different subset of multiple batteries of the plurality of batteries of the distributed battery management system, wherein the computer node is configured to store a battery management blockchain having a plurality of blocks that includes battery telemetry data for the plurality of batteries;
computer-creating a first block for the battery management blockchain stored at the computer node, the first block including the battery telemetry data for the one or more batteries;
computer-broadcasting the first block to other computer nodes in the blockchain computer network;
computer-determining that the first block has been validated by a consensus of the plurality of computer nodes of the blockchain computer network;
computer-adding the first block to the battery management blockchain stored at the computer node based on validation of the first block by the consensus of the plurality of computer nodes of the blockchain computer network;
computer-reading the battery management blockchain including the first block;
computer-adjusting an operating parameter of a selected battery of the subset of multiple batteries controlled by the computer node based on such computer-reading of the battery management blockchain including the first block;
computer-creating a second block for the battery management blockchain, the second block including an indication of the adjustment of the operating parameter of the selected battery;
computer-broadcasting the second block to other computer nodes in the blockchain computer network;
computer-determining that the second block has been validated by a consensus of the plurality of computer nodes of the blockchain computer network; and
computer-adding the second block to the battery management blockchain stored at the computer node based on validation of the second block by the consensus of the plurality of computer nodes of the blockchain computer network.

20. The method of claim 19, further comprising:
based on the computer node becoming unavailable, assigning a different computing node of the blockchain computer network to control the subset of multiple batteries based on reading the battery management blockchain.

* * * * *